UNITED STATES PATENT OFFICE.

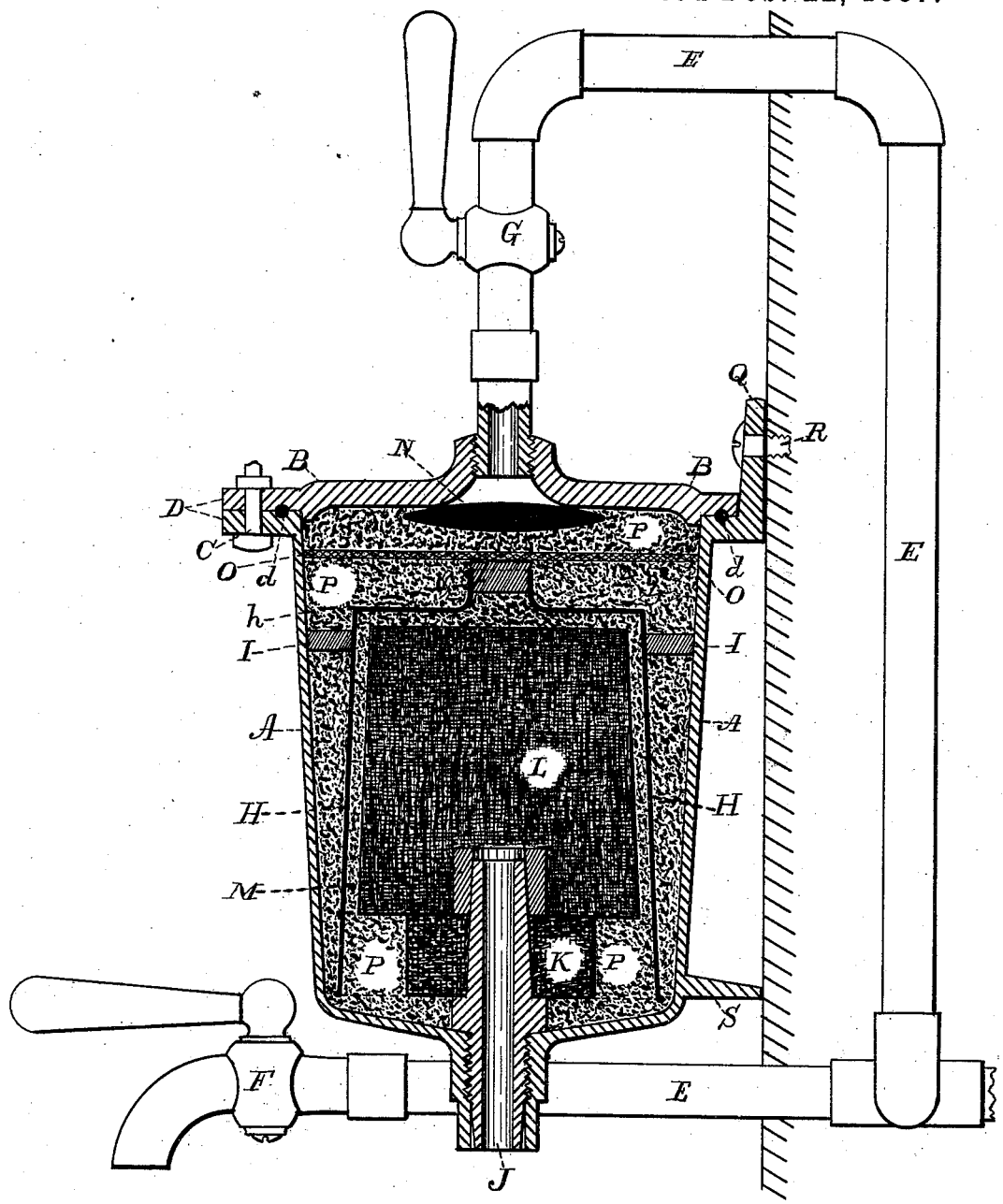

LORENS FJORD, OF ALAMEDA COUNTY, AND JOHN BROTERS, OF SAN FRANCISCO, CALIFORNIA.

WATER-FILTER.

SPECIFICATION forming part of Letters Patent No. 358,112, dated February 22, 1887.

Application filed September 18, 1886. Serial No. 213,960. (No model.)

*To all whom it may concern:*

Be it known that we, LORENS FJORD, of Alameda county, State of California, and JOHN BROTERS, of San Francisco city and county, State of California, have invented a new and Improved Water-Filter, of which the following is a specification.

This filter is intended to be used in connection with the ordinary service-pipes, as it allows the water to pass through with sufficient rapidity, obstructing its flow merely in a slight degree.

The invention consists in the combination of various parts by which a thorough cleansing action is obtained by a simple apparatus easily manipulated and preserved in good order and effectiveness.

In the accompanying drawing, forming part of this specification, the single figure is a vertical sectional elevation of the invention, taken through the center.

A is a metal pot of cylindrical form, rather larger in diameter at the top than at the bottom. B is its cover, fastened by several bolts, C, and having a rubber packing, $d$, between the flanges D.

E is the pipe leading the water to the apparatus.

F is a service-cock, which may be used when water is drawn without passing it through the filter.

G is the cock used when the water is passed through the filter.

H is what we call a "partition-cylinder." It is made of any suitable material—such as porcelain, tin, or sheet-iron. When made of metal, however, it should be vitrified or glazed with porcelain to prevent it from rusting. Similarly the whole interior of the pot A should be glazed or porcelain-lined by any of the processes commonly practiced.

The cylinder H is inverted and has an opening at top to be closed with a cork, $h$. There will be three cork wedges, I I, driven in between the outside of this cylinder H and the inside of the pot A, for the purpose of both preserving the cylinder in a central position and supporting it a little distance from the bottom of the pot A, so that the water may pass under it.

J is a metal stem with a hole bored through its center longitudinally. It is screwed into the bottom of the pot A, as shown.

K is a solidly-pressed block of a composition of animal charcoal in proportion of about ninety per cent., Para rubber about seven per cent. dissolved in naphtha, and three per cent. of sulphur. This block rests upon the stem J, as shown, a hole being provided in the center of the block to pass the stem through.

The stem J projects a trifle above the block K and enters a recess in the bottom of the larger pressed charcoal block, L, which recess is lined with a cork lining, M, the elastic nature of which substance permits the stem to be squeezed in tightly.

N is a disk of pressed charcoal, which is supported immediately under and against the hole in the center of the cover, through which the water enters the filtering-chamber. This disk acts to distribute the water over a large area of the filtering-bed below it, and prevents the water from finding its way through a direct narrow channel.

O is a piece of cloth, close woven out of asbestus fibers about as coarse as heavy sack-cloth. This mineral substance is well adapted for the purpose, as it is cheap, indestructible, cleanly, and does not deteriorate in its effectiveness. The object of placing the cloth in its position is to arrest the flow of water partially until it is equally distributed over the entire area of the filtering-bed.

P is a packing of loose granulated animal charcoal about as fine as coarse-ground coffee. It fills all the space within the interior of the pot not occupied by the other parts mentioned.

The disk N is composed of charcoal of the first fineness, about as fine as coarse sand.

The block L is composed of charcoal-grains of the second degree of fineness, about like in size to the grains of coarse meal, while the size of the charcoal-grains composing the block K and the loose charcoal filling should be about the same, as before said—as large as the grains of coarse-ground coffee.

In putting the parts of the filter together, first screw the stem J into the bottom of the pot A. Then place the block K upon it and the block L above it. Then place the cylinder H, carefully suspending it a little distance from the bottom of the pot and pour into it as much coarse loose charcoal as it will hold. Afterward close the hole on top with the cork stopple. Then fill all around the outside of the cylinder with loose charcoal until the charcoal bed reaches above the top of the cork stopple. Then spread the asbestus cloth and afterward cover with a quantity of charcoal sufficient to fill the pot up to the rim. Finally put the disk in the center and cover up the pot with the cover and tightly bolt in place.

The filter may be fastened to the wall near the place where the ordinary water-cock is situated. For this purpose the lug Q and screw-bolt R are provided, and a projecting brace-piece, S, is cast on the outside of the pot to act as a steadiment.

The operation is as follows: Water is admitted from the service-pipe by opening the cock G. It immediately distributes itself over the surface of the upper charcoal bed, a small portion only percolating through the disk N. All the water then percolates through the coarse charcoal bed very rapidly until it meets with the obstructing cloth of asbestus, through which it percolates more slowly, but equally over its whole surface. Then the water percolates still downward to the bottom of the partition-cylinder H, under which it passes to ascend rapidly and fill the entire interior of the cylinder, to finally percolate slowly through the close-grained block L from its whole surface and pass out through the hole in the stem J.

The use of loose charcoal and pressed blocks of the same is a common practice in the art. We do not therefore claim any novelty in such use. Our invention is confined to the arrangement and composition of the parts as below specifically set forth.

Water-filters have heretofore been constructed with interior cylindrical partitions applied in connection with a filtering substance to cause the water to percolate by a circuitous path to reach the discharge-orifice. We do not therefore make a broad claim to such construction. We confine ourselves to the specific arrangement herein shown and described.

We claim as our invention, and desire to secure by Letters Patent—

1. A water-filter consisting, essentially, of the pot A, stem J, blocks K and L, composed of a solidly-pressed composition of granulated animal charcoal, Para rubber, and sulphur in suitable proportions, partition-cylinder H, loose charcoal packing P, distributing-cloth O, and disk N, the arrangement being such that the water will first percolate downward through loose material to pass under the lower edge of the partition-cylinder and into the interior thereof to percolate through the pressed blocks from their entire exterior surface and out of the discharge-opening, substantially as described.

2. In a water-filter, the compressed blocks of filtering material consisting of a composition of about ninety parts animal charcoal, seven parts Para rubber dissolved in alcohol, and three parts sulphur.

3. A water-filter consisting, essentially, of the following parts: a pot, A, having inlet and outlet, a porous distributing-disk of asbestus fiber, a bed of granulated animal charcoal, a porous distributing-disk of pressed filtering material placed immediately below inlet-passage, a partition-cylinder, pressed blocks of a composition of animal charcoal, Para rubber, and sulphur in proper proportions, and a drain-pipe connecting the interior of the blocks with the outlet of the pot, the whole arranged and operating substantially as and for the purpose herein described.

LORENS FJORD.
JOHN BROTERS.

Witnesses:
GEORGE PARDY,
JAMES L. DRUM.